Nov. 14, 1961 W. J. CALDWELL 3,008,589

COMMUTATOR ORIENTING DEVICE

Filed Sept. 19, 1958 9 Sheets-Sheet 1

INVENTOR.

WASHINGTON J. CALDWELL

BY

Falvey, Souther & Stoltenberg

ATTORNEYS

INVENTOR.
WASHINGTON J. CALDWELL
BY
Falvey, Souther & Stoltenberg
ATTORNEYS

INVENTOR.
WASHINGTON J. CALDWELL
BY
Falvey, Souther & Stoltenberg
ATTORNEYS

INVENTOR.
WASHINGTON J. CALDWELL
BY
Falvey, Souther & Stoltenberg
ATTORNEYS

Nov. 14, 1961 W. J. CALDWELL 3,008,589

COMMUTATOR ORIENTING DEVICE

Filed Sept. 19, 1958 9 Sheets-Sheet 5

INVENTOR.
WASHINGTON J. CALDWELL
BY
Falvey, Souther & Stoltenberg
ATTORNEYS

Nov. 14, 1961 W. J. CALDWELL 3,008,589

COMMUTATOR ORIENTING DEVICE

Filed Sept. 19, 1958 9 Sheets-Sheet 6

INVENTOR.
WASHINGTON J. CALDWELL
BY
Falvey, Souther & Stoltenberg
ATTORNEYS

Nov. 14, 1961 W. J. CALDWELL 3,008,589

COMMUTATOR ORIENTING DEVICE

Filed Sept. 19, 1958 9 Sheets-Sheet 7

INVENTOR.
WASHINGTON J. CALDWELL
BY
Falvey, Souther & Stoltenberg
ATTORNEYS

Nov. 14, 1961 W. J. CALDWELL 3,008,589

COMMUTATOR ORIENTING DEVICE

Filed Sept. 19, 1958 9 Sheets-Sheet 8

INVENTOR.
WASHINGTON J. CALDWELL
BY
Falvey, Souther & Stoltenberg
ATTORNEYS

Nov. 14, 1961 W. J. CALDWELL 3,008,589

COMMUTATOR ORIENTING DEVICE

Filed Sept. 19, 1958 9 Sheets-Sheet 9

INVENTOR.
WASHINGTON J. CALDWELL
BY
Falvey, Southern & Stoltenberg
ATTORNEYS

United States Patent Office 3,008,589

Patented Nov. 14, 1961

3,008,589

COMMUTATOR ORIENTING DEVICE

Washington J. Caldwell, Toledo, Ohio, assignor to The Electric Auto-Lite Company, Toledo, Ohio, a corporation of Ohio Filed Sept. 19, 1958, Ser. No. 762,126
8 Claims. (Cl. 214—1)

This invention relates to a machine for manufacturing armatures for electromagnetic devices such as motors, more particularly to a machine which automatically orients and feeds a commutator to an assembly position on the machine, so that the machine may automatically affix the commutator to the armature shaft in its permanent operation position.

The machine, to which the invention has been applied, is adapted to grasp a prefabricated commutator from a magazine and move it to a first position, where the commutator is rotated in small steps until it is oriented with a feeler device which engages the slotted portions of the commutator. Then the oriented commutator is again grasped by the machine, and after the feeler devices have retreated, moves the commutator to a second position at which the shaft of the armature, also held by the machine in a pre-oriented position, is pressed into permanent operating relation with the commutator, with the conductors of the armature fitted into the slotted portion of the commuator preparatory to the staking and soldering operations which follow.

The machine, to which the invention has been applied, is also adapted to eject defective commutators by being provided with control devices, so that commutators, which are defective, will be ejected from the machine, after which a new commutator will be grasped from the magazine, and moved to the first position and cycled for the orienting step preparatory to moving to the second position. Control means are provided for sequential operation, wherein one operation follows another in a predetermined relation.

It is, therefore, a principal object of this invention to provide a machine used in connection with the manufacture of an electrodynamic machine armature, which will select a commutator, orient it with reference to an armature core, and position it permanently in operative relation with said core and its windings.

It is a further object of this invention to provide a machine for positioning commutators in permanent operative relation with reference to an armature core, which will eject from it commutators which are defective, and automatically continue its operation until a perfect one is found.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings.

Figure 1:
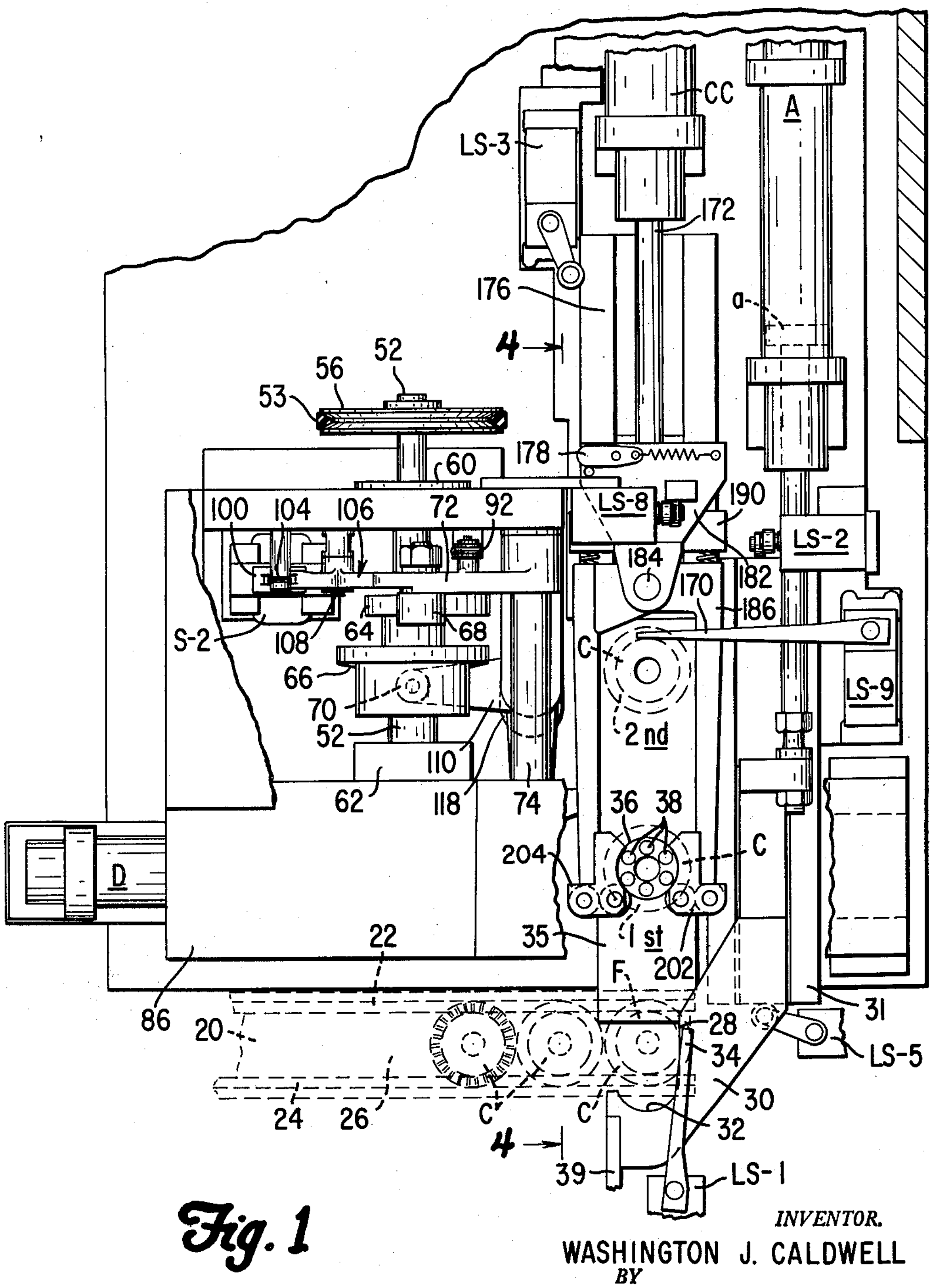
FIG. 1 is a plan view of the machine with portions cut away.

Referring to the drawings, particularly to FIG. 1, a magazine 20 is shown in which prefabricated commutators C are positioned manually by an operator in random position, but with the slotted portion thereof facing upwardly. The magazine consists of a pair of raised stationary rails 22 and 24 which are spaced apart a distance sufficient to loosely cooperate with the barrel portion of the commutators, so that they are guided to the feeding position F being moved by friction contact with a chain platform 26 which is adapted to continuously move toward the right in FIG. 1. A stop 28 is provided at position F, which is formed as an abutting surface on an advancing member 30, which draws the commutator C in the foremost position into the machine by contacting the barrel of the commutator by a centering arcuate surface 32 which places the commutator in a first position at which the commutator is oriented preparatory to being moved to a second position at which the commutator is positioned on the shaft of a prewound armature core, which is already oriented in the machine through a device not shown.

The foremost commutator C at position F contacts and displaces a pivotally-mounted arm 34 of a control switch LS–1, so that the switch is closed. The control switch LS–1 controls one phase of the operation of the machine, and, if it is not actuated by the commutator C in position F, the operation of the machine stops. This event occurs when there are no commutators in the magazine 20 to be fed into the machine and the switch LS–1 is, therefore, a safety device to prevent operation of the machine under these conditions.

Figures 2, 15:
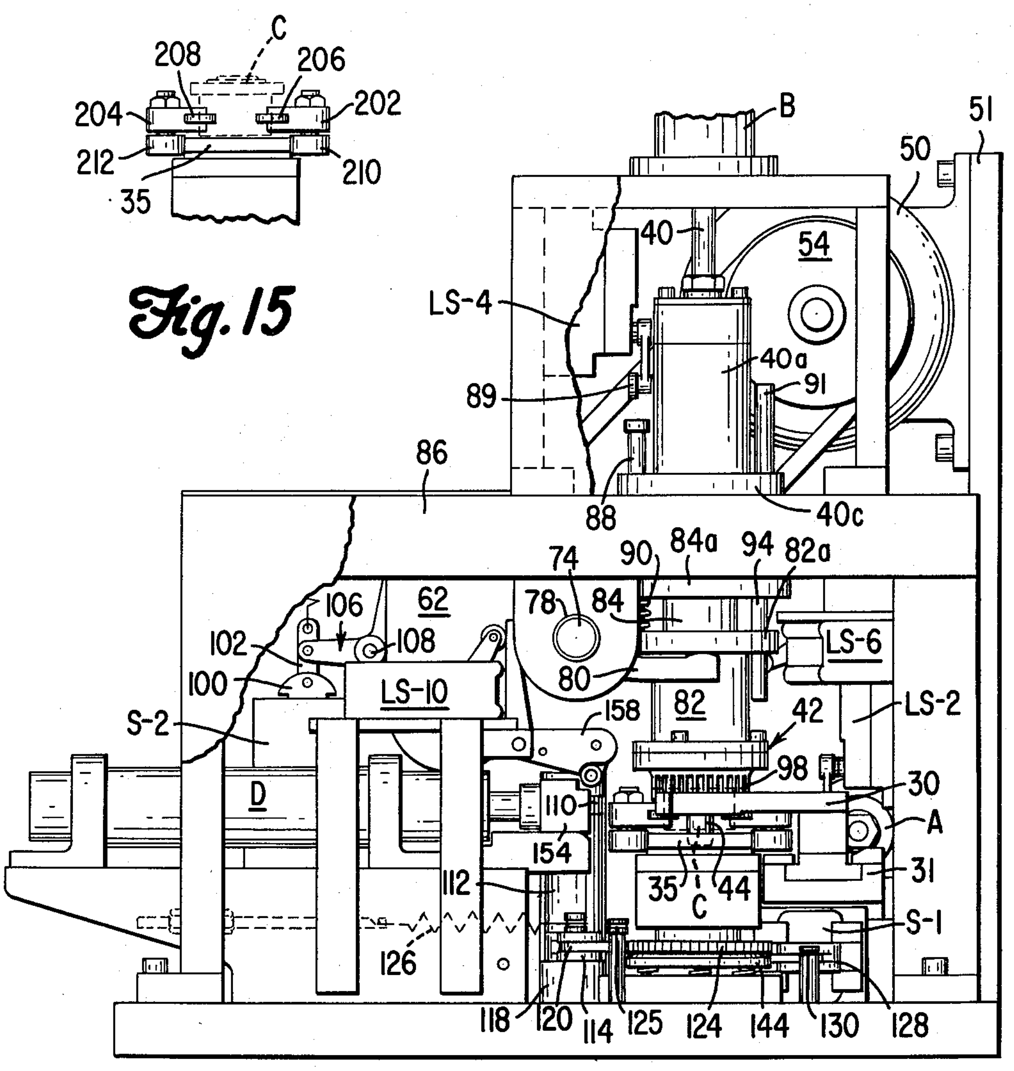
FIG. 2 is an elevational view of the machine with portions cut away.
FIG. 15 is an elevational view of the same portion shown in FIGS. 13 and 14.
Figures 6, 13, 14:
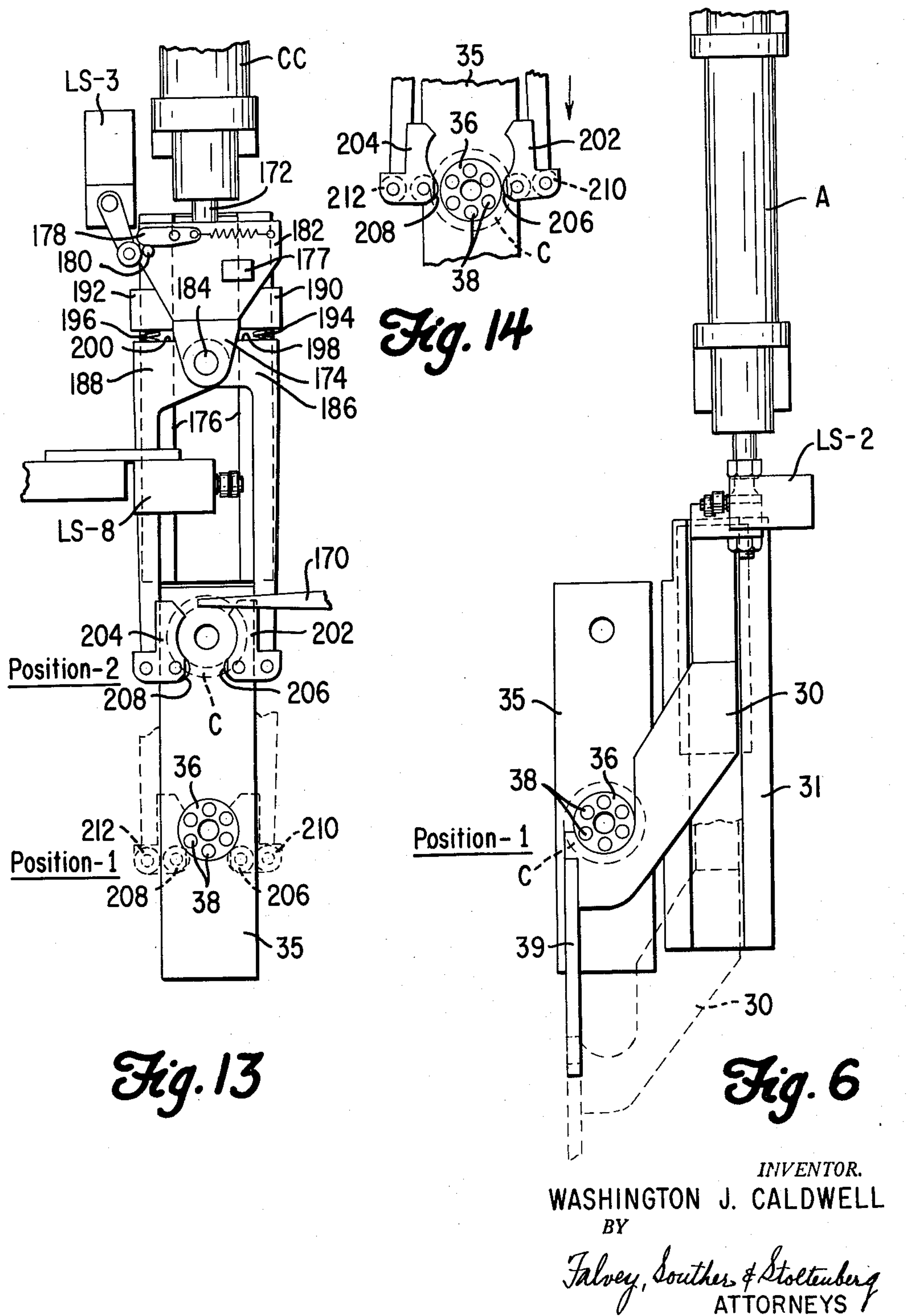
FIG. 6 is a plan view of the device moving the commutator from the conveyor to the first position.
FIG. 13 is a plan view of the commutator moving device which advances a commutator from the first position to the second position.
FIG. 14 is a plan view of a detail of the device shown in FIG. 13 in a different operating position.
Figure 16:
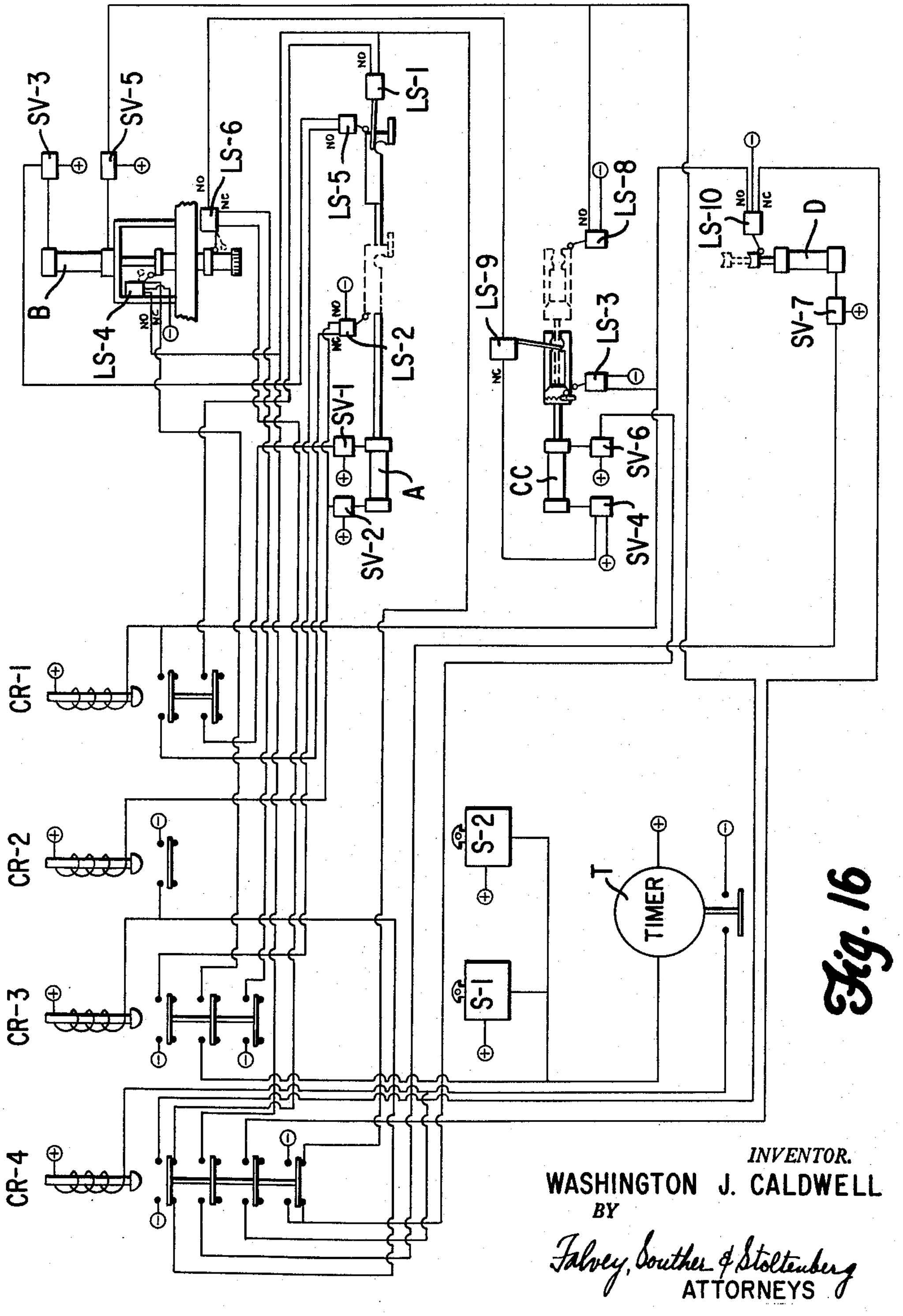
FIGS. 16 and 17 are schematic diagrams showing the electrical connections for the different parts of the machine.
Figure 17:
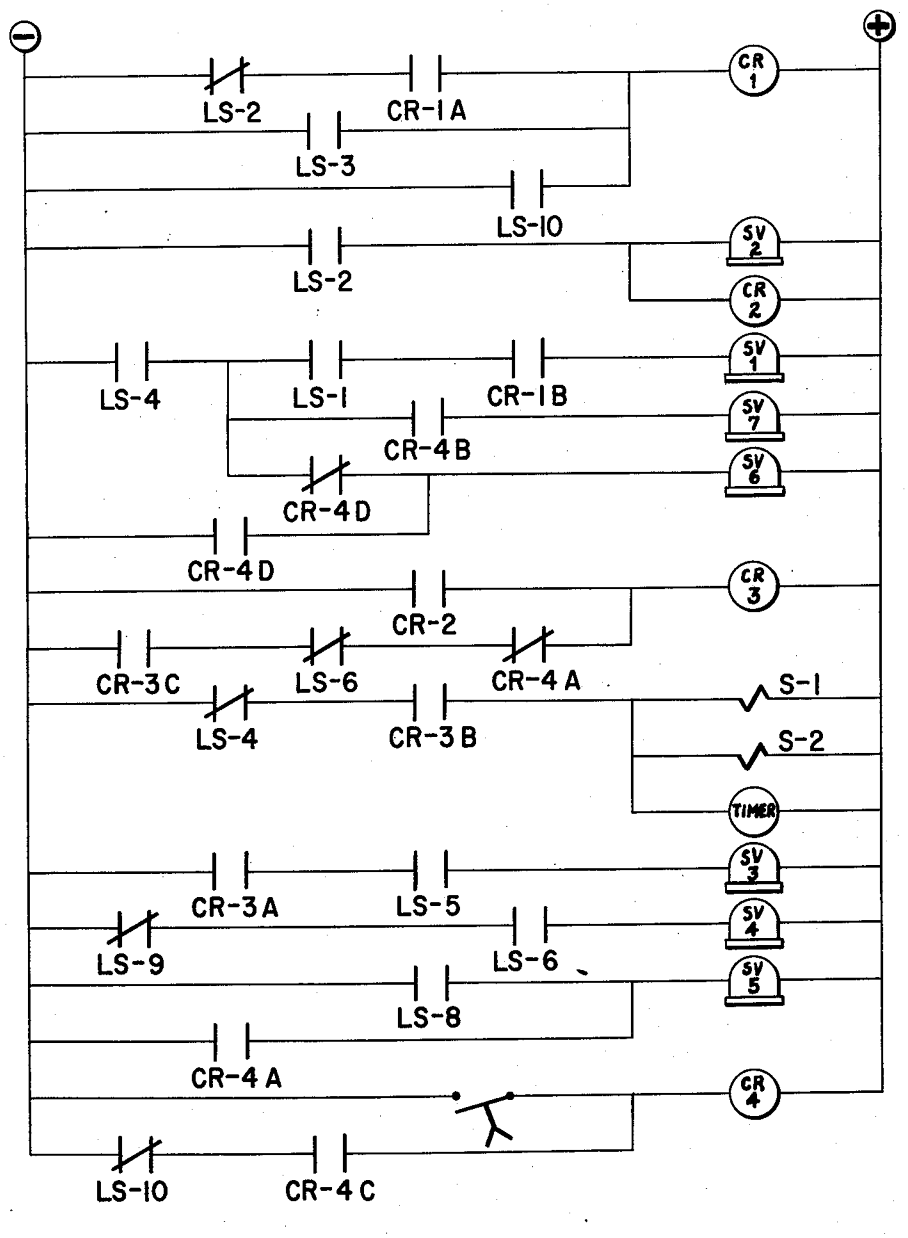

With the control switch LS–1 in closed position, the central control board shown schematically in FIGS. 16 and 17 actuates a solenoid valve SV–1 to place fluid under pressure into the lower side of cylinder A whose piston *a* is thrust upwardly (FIG. 1) to move the advancing member 30 to which the piston is connected, also upwardly, to thereby move the embraced foremost commutator C to a first position along a planar surface 35 where it is located over a rotatable head 36 flush with the surface, being provided with 6 peripherally-spaced permanent magnets 38, also flush with the surface 35, which attract and hold the magnetic portions of the commutator C just moved over them. The member 30 is provided with an extension 39, which acts as a temporary stop for the next commutator, so that it maintains its relative position on the magazine 20 as the member 30 moves inwardly as described. The inward movement of the member 30 is guided by a fixed slide 31 as best seen in FIGS. 2 and 6. The inward movement of the member 30 causes contact with limit switch LS–2, which deactivates solenoid valve SV–1 and activates solenoid valve SV–2, and places fluid under pressure in the cylinder A on the upper side of piston *a*, and, at the same time, vents the lower side of the cylinder A on the lower side of the piston *a*, again moving the member 30 downwardly to its original position. This allows the second commutator to advance until it hits stop 28 at station F and, in so doing, again actuates and keeps switch LS–1 closed. The return of member 30 to the original position also actuates switch LS–5, which actuates solenoid valve SV–3 which places fluid under pressure on the upper end of cylinder B (FIG. 2) which urges its piston and piston rod assembly 40 downwardly, on the lower end of which is attached a commutator-orienting device 42 including a pintle 44 resiliently cooperating with the piston rod which is in the nature of a plug gage for the center hole of the commutator C, so that if the center hole is too small, the pintle 44 will not enter it, so that the piston rod will not move its predetermined distance to actuate limit switch LS–6.

In the meanwhile, the actuation of switch LS–2 (FIG. 16) by the reciprocating member 30 not only actuates solenoid valve SV–2 but also energizes solenoids S–1 and S–2, of which solenoid S–1 controls a mechanism which rotates the commutator C at the first position in small steps and solenoid S–2 controls a mechanism for reciprocating orienting device 42 until the commutator is in oriented position with reference to the machine. At the same time, an electric timer T of a dashpot type is energized to establish a predetermined period of time, during which solenoid S–1 and S–2 are active, the period of time being of such length that four or five reciprocations of the orienting feeler device 42 take place before the timer initiates a new phase of the operating cycle as will be further described hereinafter.

Figure 8:
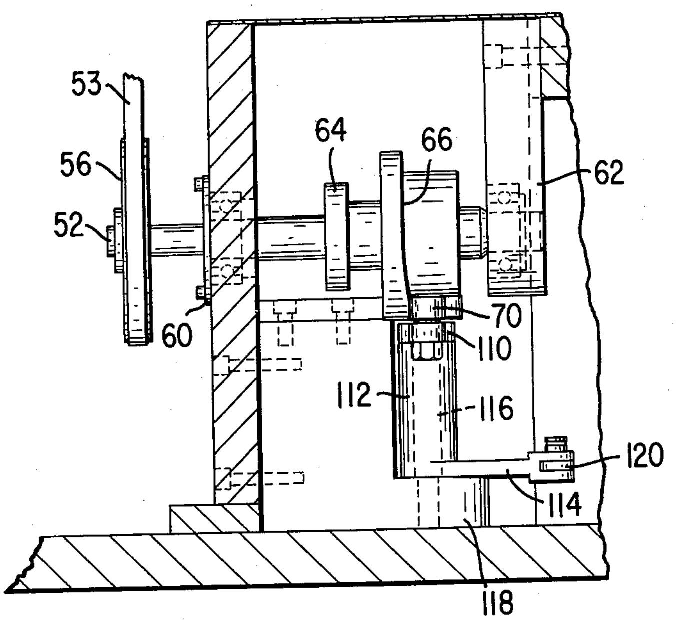
FIG. 8 is an elevational view, partly in section, of a portion of the driving mechanism for the commutator rotating device.

The power to operate these orienting and aligning devices is derived from a continuously operating electric motor 50 (affixed to a portion 51 of the frame-work) (FIG. 2) which drives a shaft 52 by a belt 53 fitted to pulleys 54 and 56 (FIG. 1) affixed to the motor shaft 58 and the shaft 52 respectively. The shaft 52 is positioned horizontally and is adapted to rotate in suitable journal bearings 60 and 62 also affixed to portions of the frame-work as best seen in FIGS. 1 and 8. Between the bearings 60 and 62, the shaft 52 has keyed to it a contour cam 64 and a face cam 66 (FIG. 1) which cooperate with cam rollers 68 and 70 respectively.

Figures 3, 9:
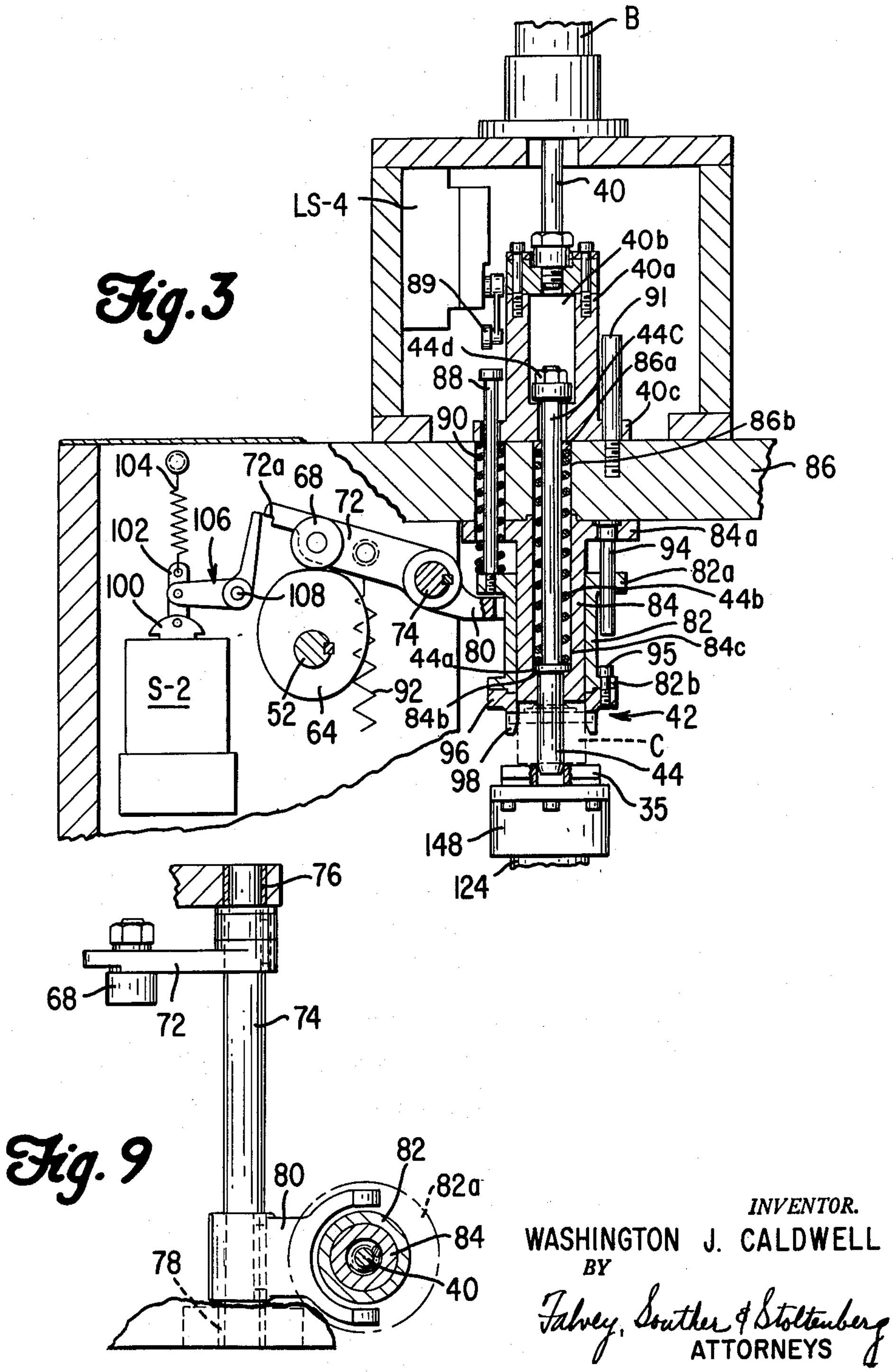
FIG. 3 is a sectional elevation of parts of the machine cooperating with the commutator.
FIG. 9 is a plan view of a detail of the device shown in FIG. 8.

Referring to FIGS. 3 and 9, it will be noted that cam roller 68 is rotatably affixed to an intermediate position on arm 72 which is keyed to a countershaft 74 in substantial parallel relation to shaft 52. The countershaft 74 is journaled in suitable bearings 76 and 78 affixed to the frame and has keyed to it at its other end a Y fork 80, which embraces a double flanged collar 82, slidably mounted on a mounting sleeve 84 also affixed to a frame portion 86 in any suitable manner, both the collar 82 and sleeve 84 are concentric with the rod 40 already described above. The upper flange 82*a* of the collar 82 is provided with headed studs 88, disposed in spaced relation 120° apart, the studs being provided with helical springs 90 to urge the collar 82 downwardly until contact is made by the lower side of the flange 82*a* with the arms of the forked member 80. The springs 90 counteract the bias of helical spring 92 which urges the cam roller 68 into contact with the rotating cam 64 mounted on the continuously rotating shaft 52, the spring 92 being of sufficient strength to maintain such contact by depressing springs 90. The collar 82 is further guided by pins 94 affixed in the flange 84*a* as shown.

The lower flange 82*b* of the collar 82 has affixed to it, in a suitable manner, as by screws 95, an orienting head 96 which has depending projecting fingers 98 to slide into the slots of the commutator C when in aligned relation to orient the commutator with the machine when the commutator is located at the first position. The fingers enter the slots of the commutator when the cam 64 is at the peak of its throw, as shown in FIG. 3; the cam 64, at the bottom of its throw, will correspondingly withdraw the fingers from the slots in the commutator, through which range the cam 64 is capable of reciprocating the collar 82 and the fingers 98 through the agency of the mechanism described.

The pintle 44 is provided with a collar 44*a* on its upper end which rests on a shoulder 84*b* in a central bore 84*c* of the sleeve 84, against which it is resiliently held by helical spring 44*b* acting against anchor 86*a* in a guide bore 86*b*. The pintle 44 is also provided with a central stem 44*c*, around which the spring 44*b* is positioned to cooperate with a control sleeve 40*a* attached in any convenient manner to the lower end of the piston rod 40 of the cylinder B. The control sleeve 40*a* has a central counterbore 40*b* and an outwardly extending flange 40*c* which cooperate with the central stem 44*c* and the pins 88 respectively as shown. The stem 44*c* is provided with a stop nut 44*d* which is positioned in the counterbore 40*b* to pull the pintle 44 upwardly against the bias of spring 44*b* when the piston rod 40 is retracted by the cylinder B. In a similar manner, the headed pins 88 are drawn upwardly by the collar 40*c* against the bias of springs 90 when the piston rod 40 is retracted as set forth. The retraction of these parts by the piston rod 40 actuates control LS–4 by contacting its arm 89. Pins 91 are provided to guide the control sleeve 40*a* during this movement.

Figure 7:
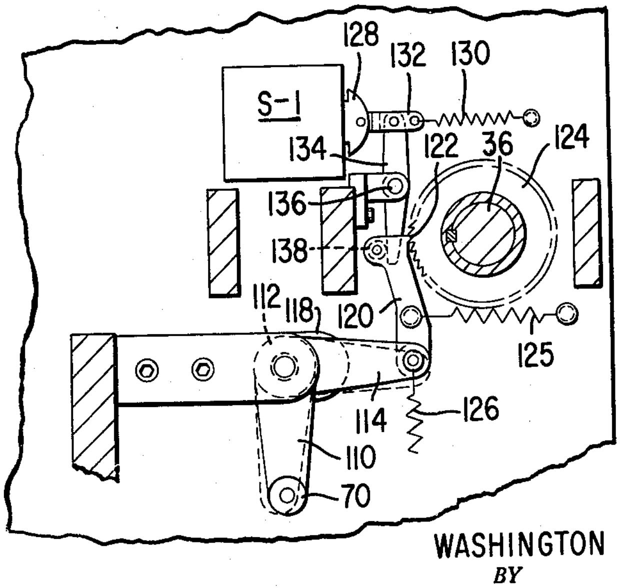
FIG. 7 is a plan view, taken along lines 7—7 of FIG. 4 of the commutator rotating device shown in FIG. 5.

As already described, the actuation of the switch LS–2 energized the solenoid S–1 and S–2 which are both affixed to the frame as seen in FIGS. 7 and 3. Now referring to FIG. 3, it will be seen that the armature 100 of the solenoid S–2 is provided with a link 102, whose upper end is attached to a tension spring 104, which urges the armature out from the solenoid. The link 102 also actuates one arm of a bell crank 106 which is pivoted on pin 108 affixed to the frame in any suitable manner as best seen in FIG. 1. The other arm of the bell crank 106 cooperates with the distal end of arm 72 and provides a lockout for the arm by cooperating with notch 72*a* therein, when the arm is adjacent its uppermost position to prevent further movement of the arm by the cam 64. This occurs when the solenoid S–2 is deenergized which allows the spring 104 to act to rotate the bell crank clockwise into locking relation. This terminates the reciprocation of the sleeve 82 and the orienting head 96.

Returning now to the solenoid S–1, as best seen in FIG. 7, it controls the action of a rotating device for the commutator in position No. 1, which is actuated by the face cam 66 cooperating with cam roller 70, as best seen in FIG. 8, by a mechanism which will now be described. The cam roller 70 is mounted on the end of a lever 110, formed integrally with a vertical bearing sleeve 112, which is provided at its bottom end with a second lever 114, extending 90° displaced from the first lever 110, forming, in effect, a bell crank. The bearing sleeve 112 is mounted for rotation on a central vertical pintle 116 affixed at its bottom end on block 118 suitably affixed to the frame member. The end of the lever 114 is bifurcated and pinned to a link 120, the end of which is provided with a pawl tooth 122 cooperating with a ratchet wheel 124, against which it is biased by a spring 125. The ratchet wheel 124 is affixed to the rotatable head 36 (FIG. 5) already described with reference to the first position, so that when the face cam 66 oscillates the arms 110 and 114 against the bias of spring 126, the link 120, with its pawl tooth 122, will rotate the ratchet wheel 124 and its head 36 in a clockwise direction (FIG. 7) in small steps determined by the throw of the cam 66.

The solenoid S–1 controls the cooperative relation between the pawl tooth 122 and the ratchet wheel 124, so that when it is energized by the actuation of switch LS–2, the armature 128 will be pulled inwardly against the bias of spring 130, with which it is connected by link 132. The link 132 is pivotally connected at a central point to the end of a lever 134 which is rotatable about a fixed central pivot point 136, so that its opposite end may cooperate with and move the end of the link 120 adjacent the pawl tooth 122 to allow engagement with the ratchet wheel 124. A roller 138 is provided on the end of link 120 to facilitate the movement mentioned. With the solenoid S–1 deenergized, the spring 130 is sufficiently strong to pull out the armature 128, and also disengage the pawl tooth 122 from the ratchet wheel 124 against the bias of spring 125.

Figure 5:
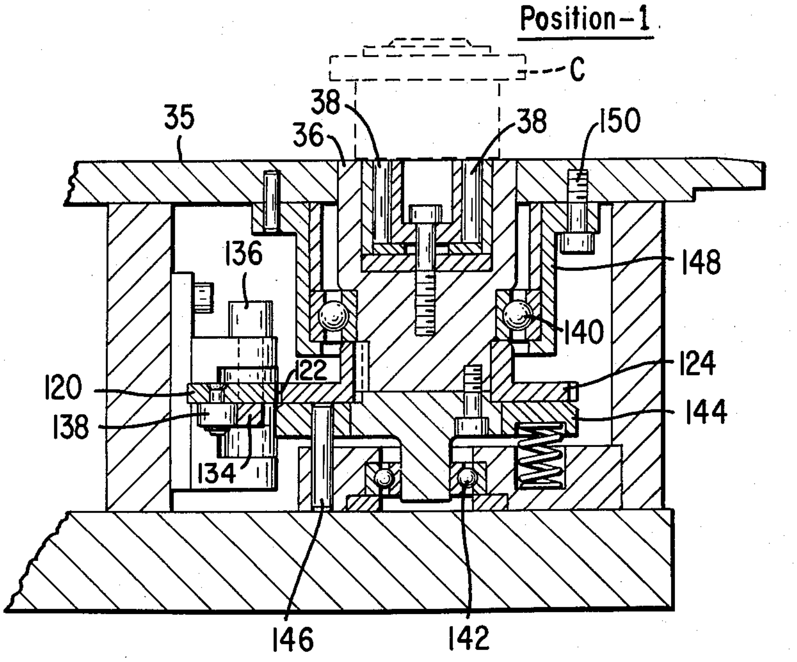
FIG. 5 is a sectional elevation of the commutator rotating device located at position I.

Referring to FIG. 5, the ratchet wheel 124 is connected to the rotatable head 36 by being keyed thereto, bearings 140 and 142 for the head 36 being provided above and below the ratchet wheel as shown. A spring-urged friction plate 144 is also provided below the ratchet wheel, rotation of the plate being prevented by anchor pin 146. The rotatable head 36 and its component parts are held in position relative to the plate 35 by a flanged cylindrical retainer 148 which is affixed to the lower side of the plate 35 by screws 150.

The rotating mechanism which rotates the commutator C at position 1 in small steps, as controlled by the solenoid S–1 (FIG. 7) and the reciprocating mechanism for the orienting feeler device 96, 98 as controlled by the solenoid S–2, operate at the same time, so that the depending projections or fingers 98 are aligned with and enter the slots of the commutator C within the period of time allowed by the timer, which is activated at the same time as solenoids S–1 and S–2. Should the fingers 98 fail to enter the commutator slots within this alloted time period, which may arise from various causes, particularly if the commutator is defective by having a slot deformed in such a manner as to cause interference, the timer will initiate an ejecting cycle which is designed to eject the defective commutator from the machine and cause a repeat of the portion of the cycle which will bring a new commutator C from the magazine through mechanisms already described. The ejecting mechanism will now be described.

Figure 10:
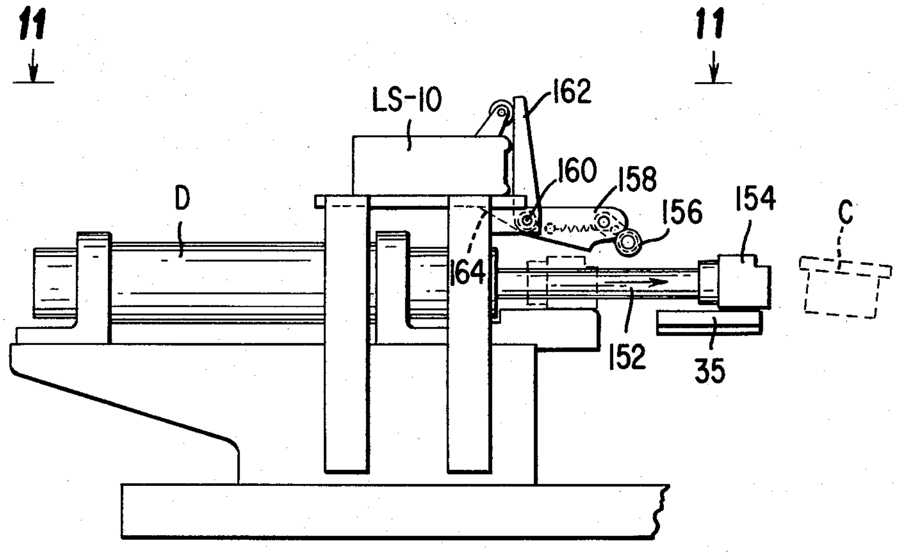
FIG. 10 is an elevational view of the commutator ejecting device.
Figure 11:
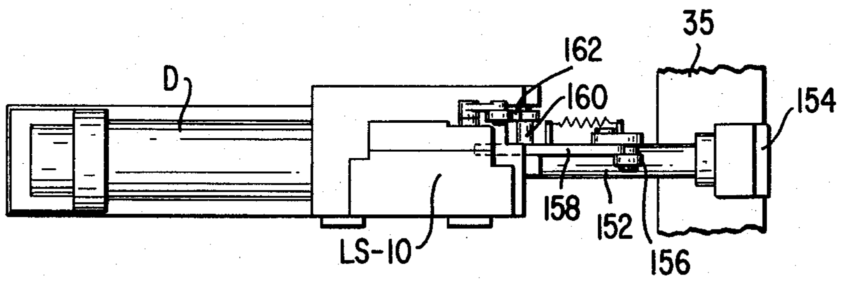
FIG. 11 is a plan view taken along the lines 11—11 of FIG. 10.
Figure 12:
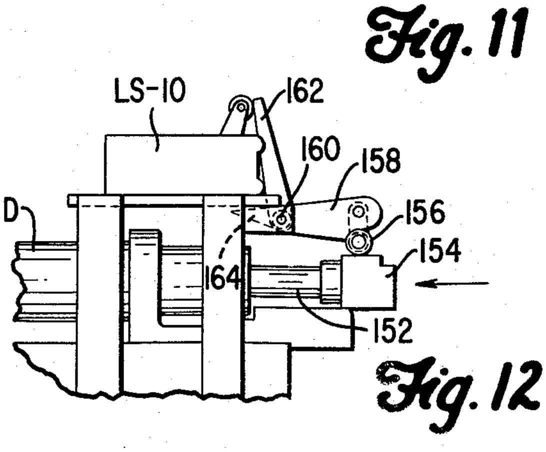
FIG. 12 is an elevational view of a device shown in FIG. 10 in a different operating position.

After the timer T (FIG. 16) has completed its time interval without having the fingers 98 of the feeler of the orienting device 42 enter the slots of the commutator, it will actuate solenoid valve SV–5, so that fluid under pressure will raise the orienting device 42 to clear the commutator and make it ready for ejection. At the same time, the timer T, through the control panel, will energize solenoid valve SV–7, which is a four-way valve, which will activate cylinder D and control the fluid under pressure to it, so that it will make one forward stroke and one return stroke. The piston rod 152 (FIGS. 10, 11, and 12) of the cylinder D moves in an axis transverse with reference to the axis of movement of the advancing member 30 (FIG. 2) to contact the commutator C positioned at the first position by a pusher element 154 located on the end of the piston rod 152 to eject the defective commutator from the machine. On the forward stroke of the element 154, it contacts and clears roller 156 resiliently mounted on the end of a bell crank 158.

The bell crank 158 is pivoted by pin 160 suitably journaled on the frame to actuate switch LS–10 only on the return stroke of element 154 by its upwardly extending arm 162. A stop 164 is provided to cooperate with a portion of the frame, so that gravity returns the bell crank to an initial position after each actuation by the element 154. The actuation of the switch LS–10 on the return stroke of the element 154 through the control panel, clears the machine and again activates solenoid valve SV–1 to cause the element 30 to advance another commutator from the magazine to the first position, which again actuates switch LS–2 to begin a new orienting cycle for the machine which has already been described. In this way, a defective commutator is ejected from the machine, and recycling occurs to bring a new commutator in the orienting position.

Figure 4:
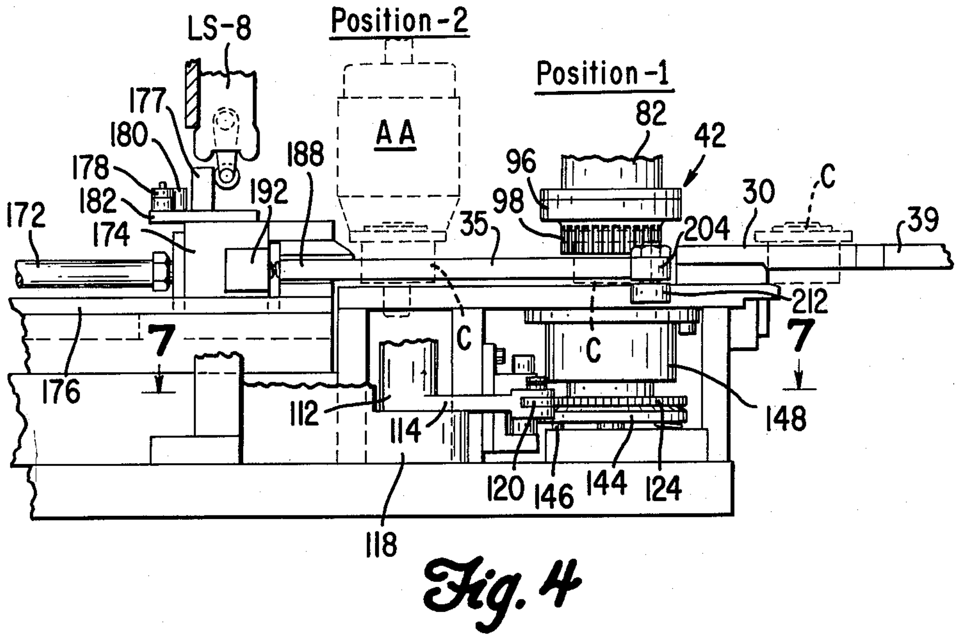
FIG. 4 is an elevational view taken along the lines 4—4 of FIG. 1 showing the two operating positions of the machine.

Assuming now that a perfect commutator is advanced to the first position, and the orienting cycle is carried through by the mechanisms already described, the orienting portion of the cycle will be terminated when the fingers 98 enter the slots of the commutator, as shown in FIG. 4. The additional movement downwardly by the orienting head 42 required for the fingers 98 to enter the slots of the commutator will actuate switch LS–6 (FIG. 2) by causing contact by the switch lever with the flange 82*a*, which will, through the agency of the control panel, activate solenoid valve SV–4 which places fluid under pressure into the distal end of cylinder CC (FIG. 1) unless the circuit to the solenoid valve SV–4 is broken by the actuation of switch LS–9 (FIG. 1) whose arm 170 is deflected by a commutator being positioned in position two, where the shaft of an armature assembly AA is engaged with an already aligned commutator as shown in FIG. 4. As long as the switch LS–9 is open, caused by the occupancy of position 2 by a commutator, the solenoid valve SV–4 will not be activated. Assuming that this commutator at position 2 is removed by being affixed to the armature assembly AA by a conveyor means (not shown) the switch LS–9 will close by the return of the arm 170, so that the solenoid valve SV–4 will operate to place the fluid under pressure in the distal end of cylinder CC to move the piston rod 172 toward position 1. A transverse head 174 (FIGS. 1 and 13) positioned on the end of the piston rod will also move in the same direction by sliding along guides 176 (FIGS. 1 and 4), which, at the extreme end of its inward motion, actuate switch LS–8 by contacting block 177 mounted on the head 174, which, through the control panel, will activate solenoid valve SV–5 controlling the lower side of cylinder B to place fluid pressure therein to raise the orienting device 42 from its cooperating relation with the commutator at position 1. This will withdraw the fingers 98 from the slots of the commutator and free it for inward movement to position 2 by a mechanism to be described. The commutator will be in oriented relation with the machine in this phase by the operation of the orienting device 42 and its cooperating mechanisms as already described.

The transistor mechanism for moving the oriented commutators from position 1 to position 2 is attached to the head 174, being adapted for controlled movement by the cylinder CC (FIG. 13). The head 174 is provided with a rearwardly projecting plate 182, on which the lever 178 and locking pin 180 are positioned. The head 174 is provided with pivot pin 184, which cooperates with a pair of bell cranks 186 and 188, the longer arms of which extend forwardly to cooperate with the commutator by gripping it between them at both position 1 and position 2 as they move the commutator between the positions. The head 174 is also provided with a pair of laterally-projecting blocks 190 and 192 which form anchors for a pair of helical springs 194 and 196 positioned on suitable locating pins on the flat front faces 198 and 200 of the bell cranks to urge the longer arms thereof toward each other at their forward ends by being urged about the pivot pin 184. At the ends of the longer arms of the bell cranks, arcuate gripping blocks 202 and 204 are provided, each of which mounts a pair of rollers, the first pair 206 and 208 cooperating with the perimeter of the commutator while the second pair 210 and 212 are disposed in depending relation with the blocks 202 and 204 to cooperate with the edges of plate 35 as best seen in FIG. 15. This prevents the arms from coming together under the action of the spring bias provided by springs 194 and 196 already described, yet allows them to spread outwardly to engage the commutator within the arcuate blocks 202 and 204.

The whole assembly attached to the head 174 advances with the piston rod 172, so that the arcuate blocks 202 and 204 are moved from position 2 to position 1, where they will contact a new commutator which has just passed through the aligning cycle. The arcuate block will be thrust outwardly when the rollers 206 and 208 contact the periphery of the barrel of the commutator, as shown in FIG. 14 coming to rest with the arcuate block resiliently gripping the commutator between them as shown in phantom in FIG. 13. In moving forwardly, the actuating block 177 on the head 174 has contacted the arm of switch LS–8 to activate it, as best seen in FIG. 4, which will substantially simultaneously cause the raising of the orienting member 42 as already described.

As the orienting member is raised, switch LS–4 is actuated which energizes solenoid valve SV–6 to cause the cylinder CC to retract the commutator from position 1 to position 2 and, in so doing, switch LS–3 is actuated by the lever 178 locking against pin 180. At position 2, an armature assembly AA is lowered and pressed into operative relation with the commutator as shown in FIG. 4. When the completed armature is removed from position 2 by moving upwardly, arm 170 of switch LS–9 is released and a new cycle of operating begins.

FIGS. 16 and 17 show the connections of the control panel and its relation to the parts of the mechanism described. These diagrams are schematic to avoid complexity, wherein the connections to bus bars are indicated by signs + and —. The connections of the various switches and solenoid valves embody safety features which are not described in full detail as being well known in the art.

I claim:

1. In a machine for indexing slotted commutators, a magazine for the commutators, means to move a commutator from the magazine to a first position for indexing, means to hold the commutator at the first position and to rotate the commutator in small steps about a vertical axis, feeler means cooperating with the commutator in the first position having projections adapted to enter the slots in the commutator bars when in indexed position, means to reciprocate the feeler means in the vertical axis alternately to the action of the means to rotate the commutator until the projections of the feeler means are engaged in said slots, and means to grip the commutator at its perimeter when the feeler means is engaged with the commutator.

2. In an aligning device, means to hold a slotted member in a predetermined position, means to move the member in small steps about an axis, feeler means movable along said axis having projections to engage the slots in said member when in alignment, and means to alternately rotate the member in said small steps and to reciprocate the feeler means until the projections of the feeler means engage the slots of said member.

3. In a machine for indexing assembling slotted commutators, a magazine for the commutators, means to move a commutator from the magazine to a first position for indexing, means to rotate the commutator in small steps at the first position in a horizontal plane, feeler means cooperating with the commutator in the first position having projections adapted to enter the slots in the commutator bars from a vertical direction when in indexed position, means to reciprocate the feeler means in a vertical plane alternately to the action of the means to rotate the commutator to engage the projections of the feeler means in said slots, and means to engage the commutator at its perimeter to grip it in indexed condition when the feeler means is engaged with the commutator, said last means being adapted to move the commutator to a second predetermined position after the commutator is disengaged by the feeler means.

4. In a machine for indexing slotted commutators, a magazine for the commutators, means to move a commutator from the magazine to a first position with the slotted portion facing upwardly, means to rotate the commutator about its vertical axis in small steps in a horizontal plane, feeler means cooperating with the commutator in the first position having depending projections adapted to enter the slots in the commutator bars when in aligned position, means to reciprocate the feeler means in a vertical direction alternately to the action of the means to rotate the commutator to engage the projections of the feeler means in said slots when the commutator is in oriented position, and means to grip the commutator at its perimeter when the commutator is in oriented position, said last means being adapted to move the commutator to a second predetermined position after the commutator is disengaged by the feeler means.

5. In a machine for indexing slotted commutators, a magazine for the commutators, means to move a commutator from the magazine to a first position, means to rotate the commutator at the first position in small steps, feeler means cooperating with the commutator in the first position having projections adapted to enter the slots in the commutator along an axial direction when in aligned position, means to axially reciprocate the feeler means alternately to the action of the means to rotate the commutator to engage the projections of the feeler means in said slots, means to control the number of reciprocations of the feeler means, means to eject the commutator from the first position if the projections of the feeler means fail to enter the slots of the commutator after the predetermined number of reciprocations due to a defect therein, and means to engage and grip the commutator at its perimeter when the feeler means is engaged in the slots with the commutator, said last means being adapted to move the commutator from the first position to a second position after the commutator is disengaged by the feeler means.

6. In an aligning device, means to hold a slotted member in a predetermined position, means to move the member in small steps about an axis, feeler means movable along said axis having projections to engage the slots in said member when in alignment, means to time the period in which the slotted member is held in said predetermined position, means to alternately rotate the member in said small steps and to reciprocate the feeler means until the projections of the feeler means engage the slots of said member, and means to eject the member after the time period has elapsed in the event the feeler means is not engaged in the slots of the member.

7. In an aligning device, means to hold a slotted member in a predetermined position with the slots facing in one direction parallel to an axis, means to move the member in small steps about the axis, feeler means movable along said axis having projections to engage the slots in said member when in alignment, means to alternately rotate the member in said small steps and to reciprocate the feeler means until the projections of the feeler means engage the slots of said member, and means to grip the member in said aligned position preparatory to moving the member from the predetermined position.

8. In an aligning device, means to hold an annular slotted member in a predetermined position with the slots arranged along radial lines, means to move the member in small steps about the annular axis, feeler means reciprocating along said axis having projections to engage the slots in said member when in alignment to orient the member including timing means to alternately rotate the member in said small steps and to reciprocate the feeler means until the projections of the feeler means engage the slots of said member, and means to eject the member from the predetermined position after a predetermined period in the event the projections on the feeler means do not engage the slots of the member.

References Cited in the file of this patent

UNITED STATES PATENTS

| | | |
|---|---|---|
| 1,772,734 | Romine | Aug. 12, 1930 |
| 2,280,573 | Flaws | Apr. 21, 1942 |
| 2,467,113 | Deiters | Apr. 12, 1949 |
| 2,673,391 | Goodwin | Mar. 30, 1954 |
| 2,783,897 | Farquharson | Mar. 5, 1957 |